US009897143B2

(12) United States Patent
Oh et al.

(10) Patent No.: US 9,897,143 B2
(45) Date of Patent: Feb. 20, 2018

(54) BUSH BEARING AND A SCROLL COMPRESSOR INCLUDING A BUSH BEARING

(71) Applicant: LG ELECTRONICS INC., Seoul (KR)

(72) Inventors: Junchul Oh, Seoul (KR); Sungyong Ahn, Seoul (KR); Eunji Hwang, Seoul (KR); Byeongchul Lee, Seoul (KR); Seheon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 17 days.

(21) Appl. No.: 14/679,077

(22) Filed: Apr. 6, 2015

(65) Prior Publication Data

US 2015/0285302 A1 Oct. 8, 2015

(30) Foreign Application Priority Data

Apr. 4, 2014 (KR) ........................ 10-2014-0040659

(51) Int. Cl.
*F03C 2/00* (2006.01)
*F03C 4/00* (2006.01)
(Continued)

(52) U.S. Cl.
CPC ............ *F16C 33/201* (2013.01); *F01C 21/02* (2013.01); *F04C 18/0215* (2013.01);
(Continued)

(58) Field of Classification Search
CPC .............. F04C 18/0215; F04C 2240/56; F04C 29/0071
(Continued)

(56) References Cited

FOREIGN PATENT DOCUMENTS

JP  57024486 A  *  2/1982  ............ F04C 23/008
JP  2004301225 A  *  10/2004  .......... F04C 18/0215
(Continued)

OTHER PUBLICATIONS

English Machine Translation of JP 2004301225 A.*
(Continued)

*Primary Examiner* — Mark Laurenzi
*Assistant Examiner* — Anthony Ayala Delgado
(74) *Attorney, Agent, or Firm* — KED & Associates, LLP

(57) ABSTRACT

A bush bearing and a scroll compressor including a bush bearing are provided. A boss of an orbiting scroll may be inserted into and coupled to a boss coupling groove of a rotational shaft, and thus, an outer circumferential surface of a bush bearing may wholly contact an inner circumferential surface of the boss coupling groove, thereby decreasing wear of the bush bearing. Further, friction loss in the bush bearing may be reduced, and thus, compression efficiency and reliability may be enhanced, noise may be reduced, and material costs may be reduced. Furthermore, despite that the bush bearing is formed in a ring shape and press-fitted to the boss, as the bush bearing may be formed of a plastic material having an ether ketone bonding in consideration of a thermal expansion rate, an elongation, and a press-fit range, the bush bearing may be effectively prevented from being detached from the boss, thereby enhancing a reliability of a compressor.

28 Claims, 15 Drawing Sheets

(51) Int. Cl.

| | | |
|---|---|---|
| F04C 18/02 | (2006.01) | |
| F04C 23/00 | (2006.01) | |
| F04C 29/00 | (2006.01) | |
| F16C 33/20 | (2006.01) | |
| F04C 29/02 | (2006.01) | |
| F01C 21/02 | (2006.01) | |
| F04C 29/06 | (2006.01) | |

(52) U.S. Cl.
CPC ...... *F04C 29/0057* (2013.01); *F04C 29/0071* (2013.01); *F04C 29/02* (2013.01); *F04C 29/06* (2013.01); *F04C 2230/60* (2013.01); *F04C 2240/56* (2013.01); *F05C 2225/12* (2013.01); *F05C 2251/00* (2013.01); *F05C 2251/14* (2013.01); *F16C 2360/42* (2013.01)

(58) Field of Classification Search
USPC ...................................................... 418/55.5
See application file for complete search history.

(56) References Cited

FOREIGN PATENT DOCUMENTS

| JP | 2009-012299 A | 1/2009 |
|---|---|---|
| JP | 2009-222207 A | 10/2009 |
| JP | 2012-122498 A | 6/2012 |
| KR | 20-1998-0056120 | 10/1998 |
| KR | 20-02982330000 | 12/2002 |
| KR | 10-2012-0009355 A | 2/2012 |
| KR | 10-2014-0039655 A | 4/2014 |

OTHER PUBLICATIONS

Sung-Kuk Ryoo et al.; "A study on Friction and Wear Behavior of Carbon Fiber Reinforced Polyetheretherketone"; pp. 930-937, 2001.
Korean Office Action issued in Application No. 10-2014-0040659 dated Jan. 27, 2015.

\* cited by examiner

BUSH BEARING AND A SCROLL COMPRESSOR INCLUDING A BUSH BEARING

CROSS-REFERENCE TO RELATED APPLICATION(S)

Pursuant to 35 U.S.C. § 119(a), this application claims priority to Korean Application No. 10-2014-0040659, filed in Korea on Apr. 4, 2014, the contents of which is incorporated by reference herein in its entirety.

BACKGROUND

1. Field

A bush bearing and a scroll compressor including a bush bearing are disclosed herein.

2. Background

A scroll compressor is a compressor in which a non-orbiting scroll is disposed in an internal space of a container, and an orbiting scroll orbits in engagement with the non-orbiting scroll to form a plurality of compression spaces, which include a suction chamber, an intermediate pressure chamber, and a discharge chamber, between a non-orbiting wrap of the non-orbiting scroll and an orbiting wrap of the orbiting scroll. The scroll compressor can obtain a relatively higher compression ratio than that of other kinds of compressors, and obtain a stable torque because a refrigerant may be smoothly suctioned, compressed, and discharged. Therefore, the scroll compressor is widely used for compression of refrigerant in, for example, an air conditioning apparatus.

Scroll compressors may be divided into a fixed radius type, in which an orbiting scroll always orbits on a same trajectory irrespective of a change in a compression condition, and a variable radius type, in which the orbiting scroll retreats in a radial direction according to the compression condition.

FIG. 1 is a vertical cross-sectional view of a related art scroll compressor. As illustrated in FIG. 1, the related art scroll compressor may include a container 1; a drive motor 2 that is disposed in an internal space of the container 1, and generates a rotating force; a main frame 3 fixedly disposed on the drive motor 2; a non-orbiting scroll 4 disposed at a top of the main frame 3; an orbiting scroll 5 disposed between the main frame 3 and the non-orbiting scroll 4, eccentrically coupled to a rotational shaft 23 of the drive motor 2, and forming a plurality of compression spaces P that continuously moves along with the non-orbiting scroll 4; and an Oldham ring 6 that is disposed between the non-orbiting scroll 4 and the orbiting scroll 5, and prevents a rotational movement of the orbiting scroll 5.

The main frame 3 may be welding-coupled to an inner circumferential surface of the container 1, and a shaft hole 31 may be formed at a center of the main frame 3 to pass through the main frame 3. A pocket groove 32 may be formed at an upper end of the shaft hole 31 so that a boss 53 of the orbiting scroll 5 may be orbitably inserted into the pocket groove 32.

A non-orbiting wrap 42 may be provided at a bottom of a plate 41 of the non-orbiting scroll 4, and a suction hole 43 may be formed at one side of the plate 41 of the non-orbiting scroll 4. A discharge hole 44 may be formed at a center of the non-orbiting scroll 4.

An orbiting wrap 52 may be provided at a top of a plate 51 of the orbiting scroll 5 so as to form the plurality of compression spaces P in engagement with the non-orbiting wrap 42 of the non-orbiting scroll 4, and the boss 53 may be provided at a bottom of the plate 51 of the orbiting scroll 5 so as to be coupled to the rotational shaft 23. A bush bearing 54, which is configured to be coupled to a pin 23d of the rotational shaft 23, may be inserted into an inner circumferential surface of the boss 53.

The rotational shaft 23 may include a shaft 23a press-fitted to a rotor 22 of the drive motor 2; a main bearing 23b and a sub bearing 23c, respectively, provided at both vertical ends of the shaft 23a and supported by the main frame 3 and a sub frame 7; and the pin 23d, which is eccentrically provided at an upper end of the main bearing 23b and coupled to the bush bearing 54 inserted into the boss 53 of the orbiting scroll 5. An eccentric mass 8 to counteract an eccentric load, which is caused by an orbiting motion of the orbiting scroll 5, may be coupled to the main bearing 23b or the shaft 23a.

In the drawing, reference number 11 refers to a suction pipe, reference numeral 12 refers to a discharge pipe, and reference numeral 21 refers to a stator.

In the related art scroll compressor, when power is applied to the drive motor 2 to generate a rotating force, the orbiting scroll 5 may be orbited with respect to the non-orbiting scroll 4 by the rotational shaft 23 coupled to the rotor 22 of the drive motor 2 to form the plurality of compression spaces P, and thus, a refrigerant may be suctioned, compressed, and discharged. At this time, the orbiting scroll 5 may receive a centrifugal force generated by the orbiting motion, a gas force generated by compressing the refrigerant, and a gas repulsion generated in an opposite direction of the centrifugal force, and thus, a movement of the orbiting scroll 5 may be unstable. However, the orbiting scroll 5 may continuously orbit by being appropriately adjusted in a state of being supported by the main frame 3.

However, in the related art scroll compressor, a large height difference "Δh" occurs between a supporting point A at which the rotational shaft 23 is supported by the main frame 3, and an action point B at which the rotational shaft 23 acts on the orbiting scroll 5, and thus, a large eccentric load may be applied to the rotational shaft 23. For this reason, a bearing load caused by a gas force may increase, and thus, compression efficiency may be reduced due to friction loss. Moreover, an action force at a welding point based on the gas force may be high, and for this reason, noise of the compressor may increase, causing a reduction in reliability.

Moreover, as a large eccentric load may be applied to the rotational shaft 23, a weight of the eccentric mass 8 disposed at the rotational shaft 23 may need to be increased, and for this reason, the cost may increase. Also, a deformation amount of the rotational shaft 23 may increase, and for this reason, compression efficiency may be reduced due to friction loss. Also, a centrifugal force of the eccentric mass 8 may increase, and thus, an action force at a welding point may increase. For this reason, noise of the compressor may increase, causing a reduction in reliability.

Moreover, the shaft hole 31, in which the main frame 3 supports the rotational shaft 23, may be separated, by a certain interval, from the pocket groove 32, into which the boss 53 of the orbiting scroll 5 is orbitably inserted, and thus, a length of the main bearing 23b of the rotational shaft 23 may become longer. Also, a large eccentric load may be applied to the rotational shaft 23, and thus, a bearing length of the main frame 3 may increase. For this reason, an axial direction length of the compressor may increase, increasing material costs. In addition, there is a limitation in increasing a stacked height of a motor within a limited axial direction length of the compressor, and for this reason, there is a limitation in increasing a capacity of the compressor with respect to a length of the same compressor.

BRIEF DESCRIPTION OF THE DRAWINGS

Embodiments will be described in detail with reference to the following drawings in which like reference numerals refer to like elements, and wherein.

DETAILED DESCRIPTION

Description will now be given in detail of embodiments, with reference to the accompanying drawings. For the sake of brief description with reference to the drawings, the same or equivalent components will be provided with the same reference numbers, and description thereof will not be repeated.

Hereinafter, a bush bearing and a scroll compressor including a bush bearing according to embodiments will be described in detail with reference to the accompanying drawings.

Figure 1:
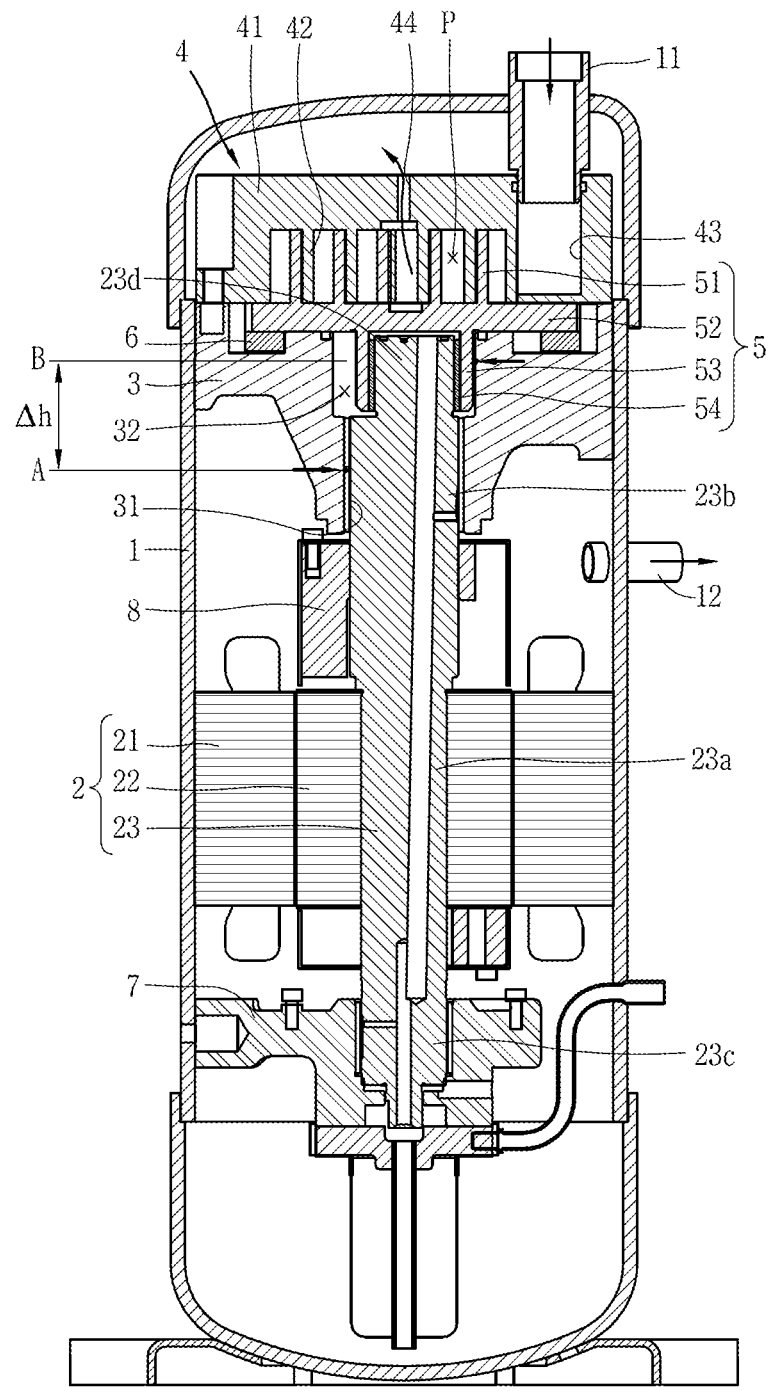
FIG. 1 is a vertical cross-sectional view of a related art scroll compressor.
Figure 2:
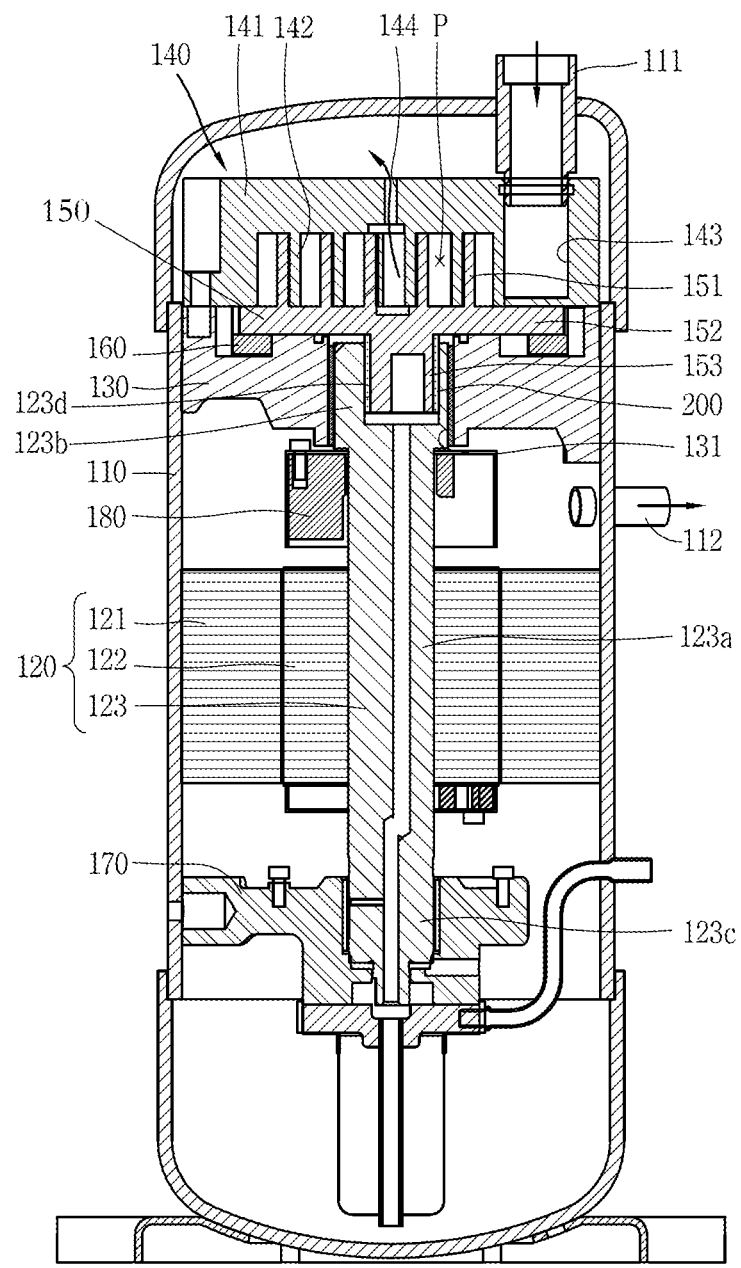
FIG. 2 is a vertical cross-sectional view of a scroll compressor according to an embodiment.

FIG. 2 is a vertical cross-sectional view of a scroll compressor according to an embodiment. As illustrated in FIG. 2, in the scroll compressor according to an embodiment, a drive motor 120 that generates a rotating force may be disposed in an internal space of a container 110, and a main frame 130 may be fixedly disposed on the drive motor 120. A non-orbiting scroll 140 may be disposed at a top of the main frame 130, and an orbiting scroll 150 may be disposed between the main frame 130 and the non-orbiting scroll 140. The orbiting scroll 150 may be eccentrically coupled to a rotational shaft 123 of the drive motor 120 so as to form a plurality of compression spaces P that continuously moves along with the non-orbiting scroll 140. An Oldham ring 160 that prevents a rotational movement of the orbiting scroll 150 may be disposed between the non-orbiting scroll 140 and the orbiting scroll 150.

The main frame 130 may be, for example, welding-coupled to an inner circumferential surface of the container 110, and a shaft hole 131 may be formed at a center of the main frame 130 to pass the rotational shaft 123 therethrough. The shaft hole 131 may be formed to have a same diameter from an upper end to a lower end.

In the non-orbiting scroll 140, a non-orbiting wrap 142 that protrudes from a bottom of a plate 141 of the non-orbiting scroll 140 may be provided to form the plurality of compression spaces P along with an orbiting wrap 152 of the orbiting scroll 150, and a suction hole 143 may be formed at or in the plate 114 of the non-orbiting scroll 140 in order for a suction pipe 111 to communicate with the plurality of compression spaces P.

A discharge hole 144 may be formed at a center of the plate 141 of the non-orbiting scroll 140 in order for the plurality of compression spaces P to communicate with an internal space of the container 110, and a check valve (not shown), which may open the discharge hole 144 when the scroll compressor is normally driven and close the discharge hole 144 to prevent a discharged refrigerant from reversely flowing into the plurality of compression spaces P through the discharge hole 144 when the scroll compressor stops, may be disposed at an end of the discharge hole 144.

In the orbiting scroll 150, the orbiting wrap 152, which may protrude from a bottom of a plate 151 of the orbiting scroll 150, may be provided to form the plurality of compression spaces P in engagement with the non-orbiting wrap 142 of the non-orbiting scroll 140, and a boss 153 may be provided at a bottom of the plate 151 of the orbiting scroll 150, so that the boss 153 may be inserted into a boss coupling groove 123d of the rotational shaft 123 to receive the rotating force.

The boss 153 may be provided at a geometric center of the orbiting scroll 150. Further, the boss 153 may be formed in a solid cylinder shape, or may be formed in a hollow cylinder shape so as to reduce a weight of the orbiting scroll 150.

The rotational shaft 123 may include an axis or shaft 123a, which may be press-fitted to a rotor 122 of the drive motor 120; a main bearing 123b and a sub bearing 123c respectively provided at both vertical sides or ends of the shaft 123a, and, respectively, supported by the main frame 130 and a sub frame 170; and the boss coupling groove 123d eccentrically provided at an upper end of the main bearing 123b, and into which the boss 53 of the orbiting scroll 5 may be inserted and coupled to the boss coupling groove 123d.

An eccentric mass 180 to counteract an eccentric load, which may be caused by an orbiting motion of the orbiting scroll 150, may be coupled to the main bearing 123b or the shaft 123a.

Figure 3:
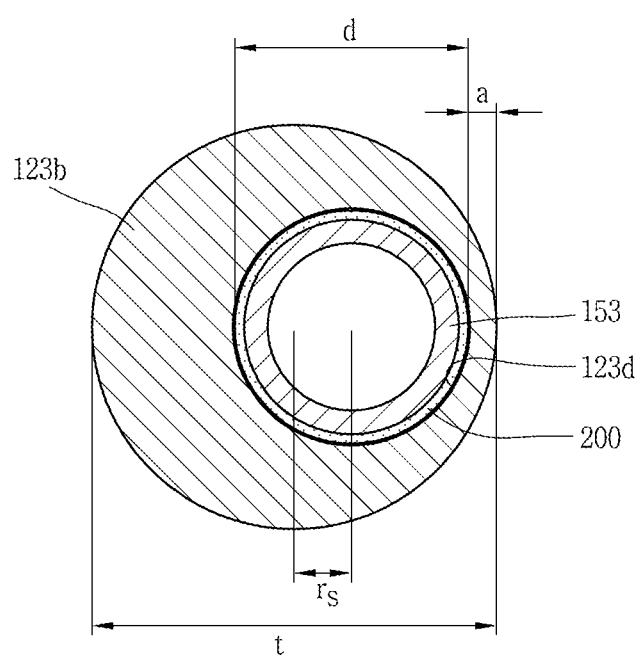
FIG. 3 is a horizontal cross-sectional view for describing a minimum thickness of a boss coupling groove in the scroll compressor of FIG. 2.
Figure 4:
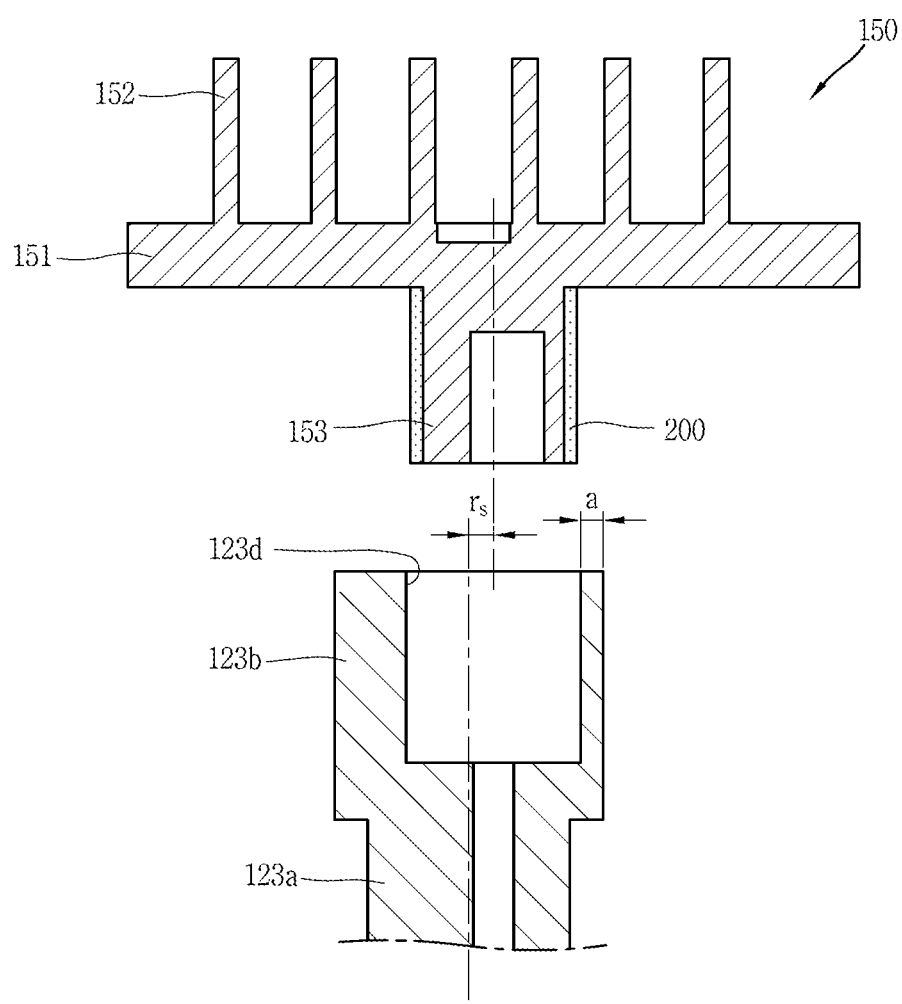
FIG. 4 is an exploded cross-sectional view of an orbiting scroll and a rotational shaft of the scroll compressor of FIG. 2.

FIG. 3 is a horizontal cross-sectional view for describing a minimum thickness of a boss coupling groove in the scroll compressor of FIG. 2. FIG. 4 is an exploded cross-sectional view of an orbiting scroll and a rotational shaft of the scroll compressor of FIG. 2.

As illustrated in FIGS. 3 and 4, a cross-sectional area of the main bearing 123a may be greater than a cross-sectional area of the shaft 123a, and the boss coupling groove 123d may be eccentrically formed in one side direction from a top of the main bearing 123b. An outer diameter t of the main bearing 123b may be determined by a minimum interval "a" from an outer circumferential surface of the main bearing 123b to an inner circumferential surface of the boss coupling groove 123d.

For example, when the outer diameter of the main bearing 123b is t, an outer diameter of the boss 153 of the orbiting scroll 150 is d, and an eccentric amount of the boss coupling groove 123d is $r_s$, a minimum interval "a" may be expressed as the following Equation:

$$a=(t-d)/2-r_s$$

When a diameter of the main bearing 123b is small, the minimum interval "a" is very thin, and for this reason, a reliability of the main bearing 123b may be degraded. On the other hand, when the diameter of the main bearing 123b is too large, the minimum interval "a" may be sufficiently secured, and thus, a reliability of the main bearing 123b maybe enhanced. However, a bearing area increases, causing an increase in friction loss. Therefore, the minimum interval "a" may be appropriately maintained to secure a reliability of the main bearing 123b and minimizing friction loss. To this end, the minimum interval "a" may be formed within a range of "d/20<a<d/4".

In the drawings, reference numeral 121 is a stator, and reference numeral 112 is a discharge pipe.

The scroll compressor according to an embodiment may have the following operational effects.

When power is applied to the drive motor 120 to generate a rotating force, the orbiting scroll 150, which may be eccentrically coupled to the rotational shaft 123, may perform an orbiting motion to form the plurality of compression spaces P that continuously moves between the orbiting scroll 150 and the non-orbiting scroll 140. Therefore, a volume of each of the plurality of compression spaces P may be narrowed in a direction from the suction hole (or a suction chamber) 143 to the discharge hole (or a discharge chamber) 144, and thus, the plurality of compression spaces P is continuously formed in several stages.

Therefore, a refrigerant provided from outside of the container 110 may flow into the container 110 through the suction pipe 111 and the suction hole 143 of the non-orbiting scroll 140, and the refrigerant may be compressed while being moved toward a final compression space by the orbiting scroll 150, and discharged from the final compression space to the internal space of the container 110 through the discharge hole 144 of the non-orbiting scroll 140. Such a process may be repeated.

Figure 5:
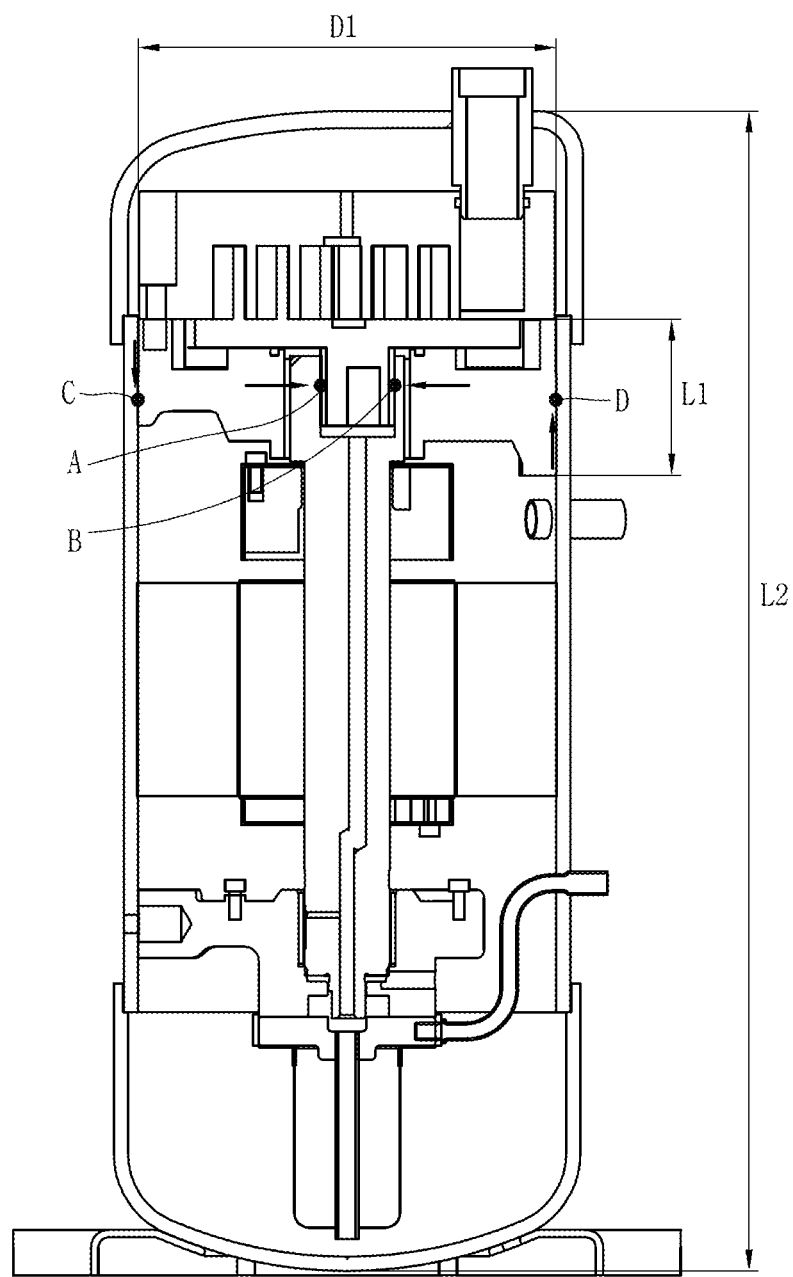
FIG. 5 is a schematic view illustrating a standard of components in the scroll compressor of FIG. 2.

As illustrated in FIG. 5, the boss 153 of the orbiting scroll 150 may be inserted into and coupled to the boss coupling groove 123d of the rotational shaft 123, thereby removing or reducing a large height difference (Δh=0) between a supporting point A, at which the rotational shaft 123 is supported by the main frame 130, and an action point B, at which the rotational shaft 123 acts on the orbiting scroll 150. Therefore, an eccentric load applied to the rotational shaft 123 may be reduced. Accordingly, friction loss in the main bearing 123b may be reduced, and thus, compression efficiency may be enhanced. In addition, an action force C (D) at a welding point between the container 110 and the main frame 130 may be lowered, and thus, noise of the scroll compressor may decrease, thereby enhancing reliability.

Moreover, as the eccentric load applied to the rotational shaft 123 may be reduced, a weight of the eccentric mass 180 disposed at the rotational shaft 123 may be reduced, costs reduced, and a deformation amount of the rotational shaft 123 decreased, thereby enhancing compression efficiency. Also, as the action force (C) (D) (generated by a centrifugal force of the eccentric mass 180) at a welding point between the container 110 and the main frame 130 may be lowered, noise of the scroll compressor may decrease, thereby enhancing reliability.

Moreover, as a pocket groove is not additionally formed at the main frame 130, a length L1 and a diameter D1 of the main frame 130 may be reduced to decrease material costs, and an axial length L2 of the scroll compressor may be reduced to miniaturize the scroll compressor without a change in capacity. Also, a stacked height of the motor may increase within the limited axial length L2 of the scroll compressor, thereby enhancing performance of the scroll compressor.

A bearing member 200 that provides lubrication between the boss 153 and the boss coupling groove 123d may be disposed between the boss 153 of the orbiting scroll 150 and the boss coupling groove 123d of the rotational shaft 123. The bearing member 200 may be in the form of a needle bearing, a roller bearing, or a ball bearing, for example. In this case, as a size of the bearing member is large, the shaft hole 131 of the main frame 130 may be enlarged, and for this reason, friction loss may increase. Therefore, according to this embodiment, a bush bearing may be applied as the bearing member 200.

The bearing member 200 having a bush bearing type may be provided at the boss 153 of the orbiting scroll 150 instead of an inner circumferential surface of the boss coupling groove 123d. That is, when the bearing member 200 is provided at the boss 153, an outer circumferential surface of the bearing member 200 may wholly contact the inner circumferential surface of the boss coupling groove 123d, and thus, the bearing member 200 may intensively contact at one point and wear may be prevented, thereby considerably decreasing damage to the bearing member 200 caused by wear.

Figure 6:
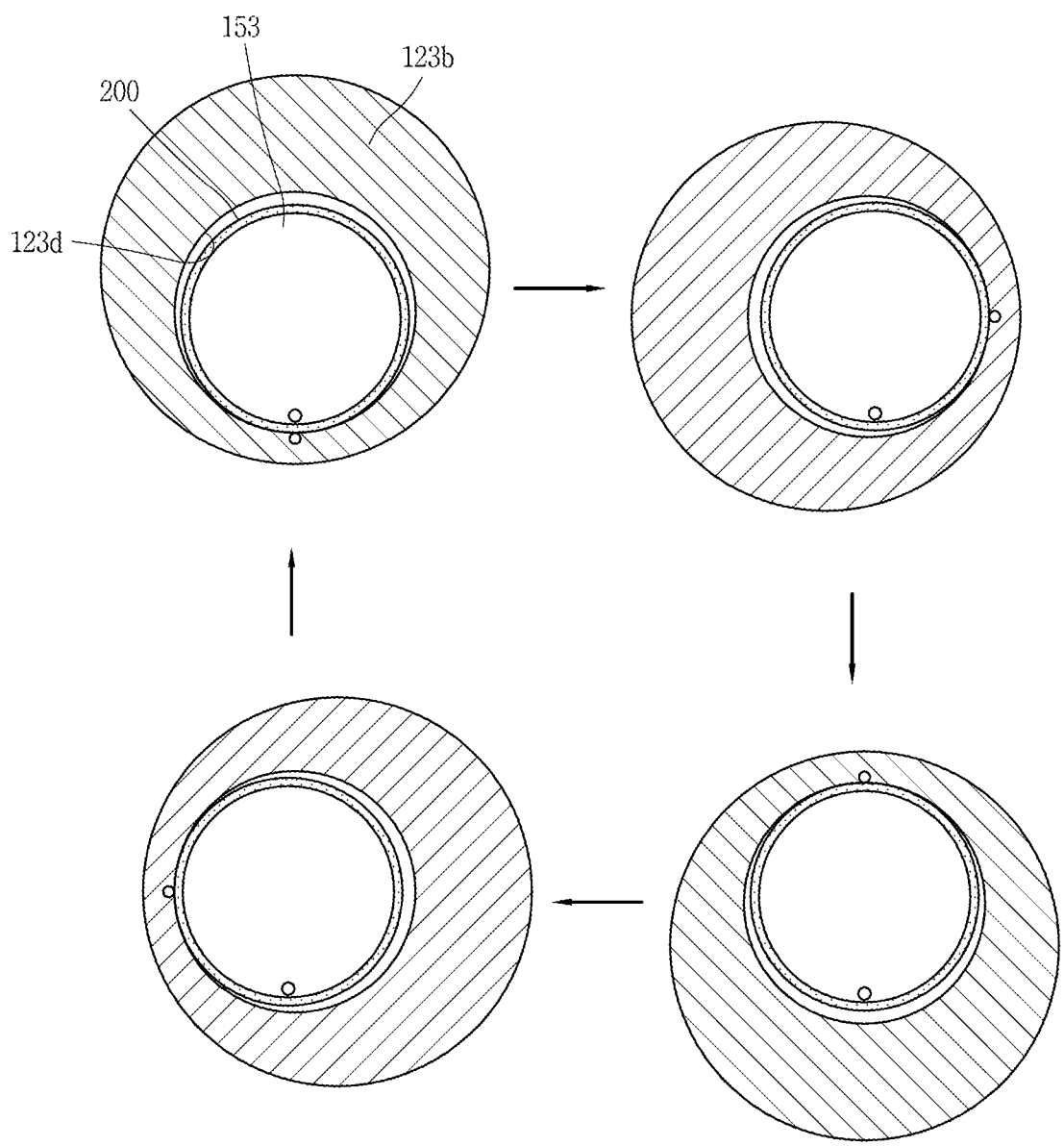
FIG. 6 is a plan view for describing a contact relationship, based on rotation of a rotational shaft, between a bush bearing and a boss coupling groove in the scroll compressor of FIG. 2.

As illustrated in FIG. 6, in which a case in the boss 153 of the orbiting scroll 150 is inserted into the boss coupling groove 123d of the rotational shaft 123, the rotational shaft 123 may rotate in a state in which a center 0 of the rotational shaft 123 matches a center 0' of the boss 153, and thus, an inner circumferential surface of the boss coupling groove 123d may contact an entire outer circumferential surface of the boss 153 at one point along an axial length thereof. That is, the entire outer circumferential surface of the boss 153 may contact one point of the inner circumferential surface of the boss coupling groove 123d along an axial length thereof.

Therefore, the outer circumferential surface of the boss 153 may uniformly contact the inner circumferential surface of the boss coupling groove 123d, at one point, and thus, wear may be prevented. However, as the boss coupling groove 123d contacts the outer circumferential surface of the boss 153 at only one point, intensive wear may occur at the one point, that is, the contact point. Therefore, when the bearing member 200 is disposed at the boss coupling groove 123d, intensive wear may occur at one point of the bearing member 200, and reliability may be degraded or reduced. Thus, when the bearing member 200 is disposed at the outer circumferential surface of the boss 153 which wholly contacts the boss coupling groove 123, the bearing member 200 may be prevented from being damaged, thereby increasing reliability.

Figure 7:
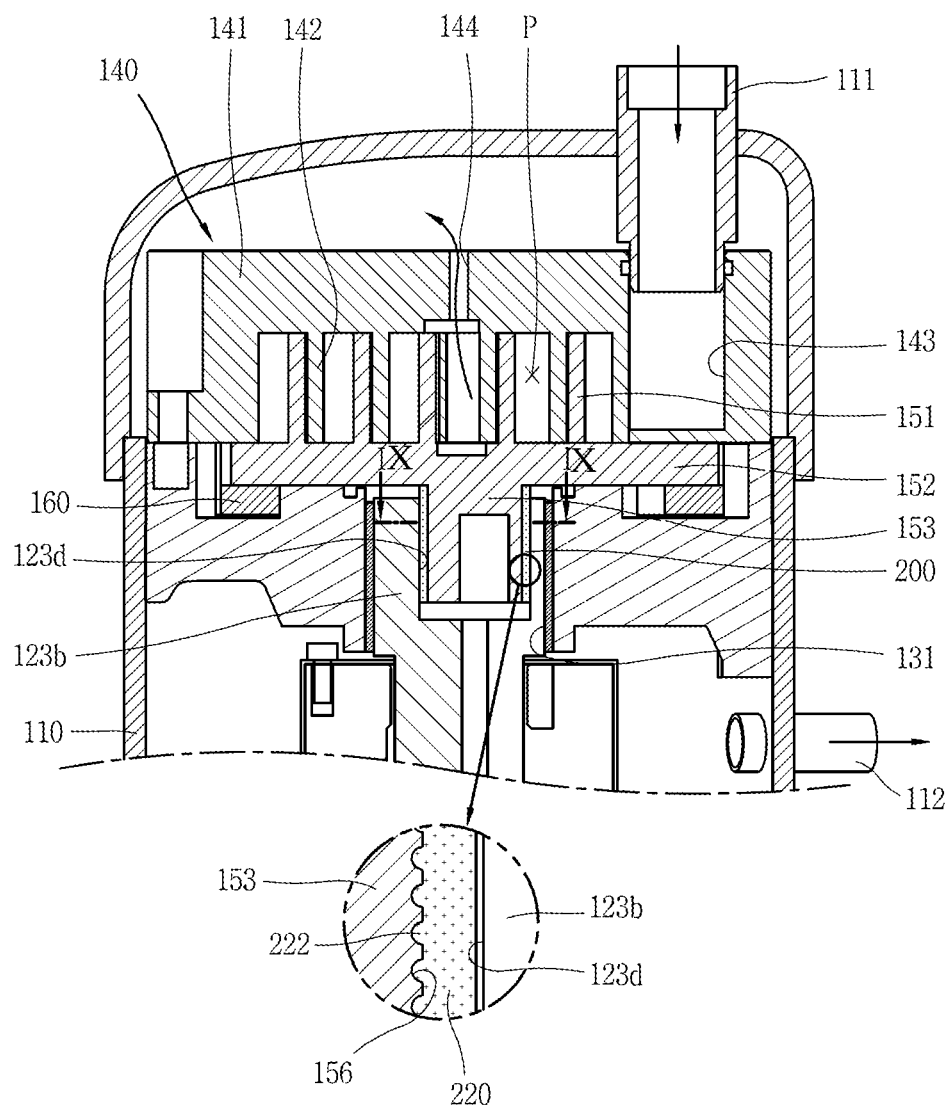
FIG. 7 is a vertical cross-sectional view illustrating a compression device coupled to a bush bearing in the scroll compressor of FIG. 2.
Figure 8:
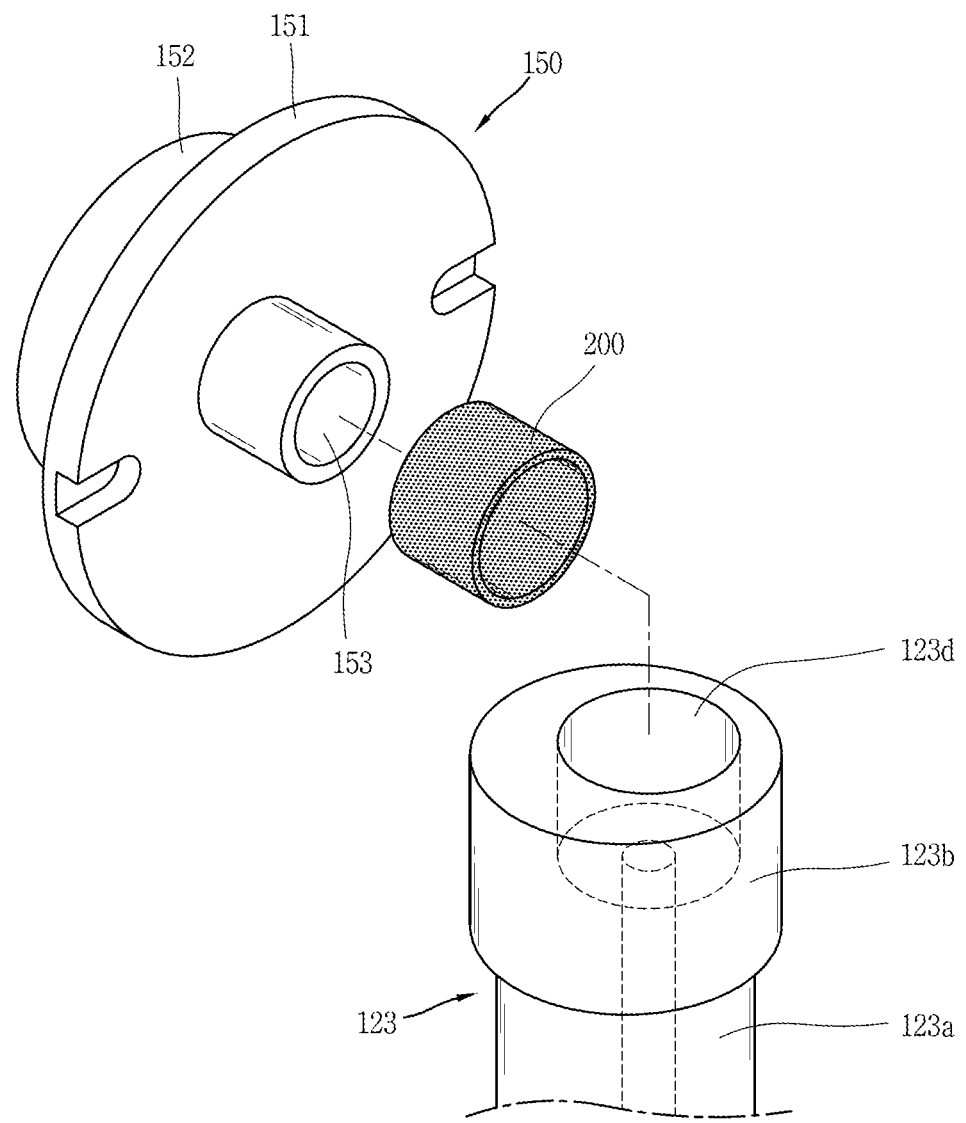
FIG. 8 is a perspective view illustrating a state in which the orbiting scroll, the rotational shaft, and the bush bearing are disassembled in the scroll compressor of FIG. 2.
Figure 9:
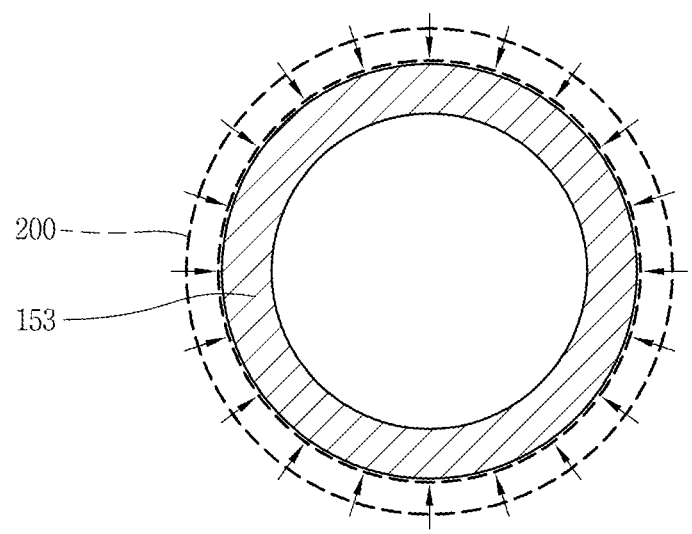
FIG. 9 is a cross-sectional view taken along line IX-IX of FIG. 7, and is a schematic view illustrating a process in which the bush bearing is restored and press-fitted to the boss of the orbiting scroll.

The bearing member 200 may be formed in various shapes. FIG. 7 is a vertical cross-sectional view illustrating a compression device coupled to a bush bearing in the scroll compressor of FIG. 2. FIG. 8 is a perspective view illustrating a state in which the orbiting scroll, the rotational shaft, and the bush bearing are disassembled in the scroll compressor of FIG. 2. FIG. 9 is a cross-sectional view taken along line IX-IX of FIG. 7, and is a schematic view illustrating a process in which the bush bearing is restored and press-fitted to the boss of the orbiting scroll.

As illustrated in FIGS. 7 to 9, the bearing member 200 may be formed in a ring-shaped bush form having no slit using a self-lubricative material as a single member, and may be press-fitted and coupled to the boss 153 of the orbiting scroll 150. In this case, as the bearing member 200 is provided as a single member, a thickness is not largely increased in comparison with a bearing member configured with a fixed bush and a lubricating bush described hereinbelow, and a certain thickness of a bearing may be secured in comparison with a below-described bearing member, which is formed by coating, thereby preventing the bearing member from being damaged due to wear.

When the bearing member 200 is inserted into the outer circumferential surface of the boss 153, selecting a material of the bearing member 200 (hereinafter referred to as a "bush bearing") is important for reliability. That is, as the bush bearing 200 is under a high service temperature of 120° C. to 150° C., which is a drive temperature of the compressor, the bush bearing 200 should have chemical stability, high hardness characteristic, anti-friction, and anti-abrasion.

Moreover, when the bush bearing 200 uses a material having an appropriate thermal expansion coefficient, the bush bearing 200 may stably perform a function of a bearing without being detached from the boss 153. That is, when a drive temperature increases while the compressor is being driven, the bush bearing 200 and the boss 153 are thermally expanded. When a thermal expansion coefficient of the bush bearing 200 is too much greater than a thermal expansion coefficient of the boss 153, an inner diameter of the bush bearing 200 becomes greater than an outer diameter of the boss 153 under a high temperature environment in driving, and the bush bearing 200 may be detached from the boss 153. On the other hand, when the thermal expansion coefficient of the bush bearing 200 is too much less than the thermal expansion coefficient of the boss 153, the bush bearing 200 may be plastically deformed or damaged by the thermal expansion of the boss 153.

In consideration of such features, the bush bearing 200 may be formed of a material that enables the press-fitting of an outer diameter and has oil-free characteristic, namely, a polyether ether ketone (PEEK) material which is a plastic material having an ether ketone bonding. As described above, when the bush bearing 200 is formed of a PEEK material, a detailed material should be selected in appropriate consideration of a thermal expansion coefficient, a maximum press-fit range, or a minimum press-fit range of the bush bearing 200, and thus, the bush bearing 200 may smoothly perform a function of a bearing without being detached from the boss 153.

The bush bearing 200 may be formed of a material in which a thermal expansion coefficient of the bush bearing 200 is about 0.9 to 5 or less times the thermal expansion coefficient of the boss 153. In particular, when the bush bearing 200 is formed of a material in which the thermal expansion coefficient of the bush bearing 200 is about 5 or less times the thermal expansion coefficient of the boss 153, the bush bearing 200 may be prevented from being plastically deformed or damaged due to thermal expansion. However, the thermal expansion coefficient of the boss 153 may be greater than the thermal expansion coefficient of the bush bearing 200. In a case that the thermal expansion coefficient of the boss 153 is far greater than the thermal expansion coefficient of the bush bearing 200, when the boss 153 is thermally expanded by a drive temperature of the compressor, the bush bearing 200 may be prevented from being plastically deformed or damaged, and thus, the thermal expansion coefficient of the bush bearing 200 may be approximately 0.9 times greater than the thermal expansion coefficient of the boss 153.

When the thermal expansion coefficient of the boss 153 is greater than the thermal expansion coefficient of bush bearing 200, the bush bearing 200 may be more thermally expanded than the boss 153 while the compressor is being driven, and thus, the bush bearing 200 may be detached from the boss 153. Therefore, when the thermal expansion coefficient of the boss 153 is greater than the thermal expansion coefficient of the bush bearing 200, the scroll compressor may further include a means to prevent the bush bearing 200 from being detached from the boss 153 by thermal expansion.

For example, in consideration of a physical property value of a material of the bush bearing 200, the bush bearing 200 may be enlarged as much as possible and press-fitted to the boss 153, and thus, even when the thermal expansion coefficient of the bush bearing 200 is greater than the thermal expansion coefficient of the boss 153, the bush bearing 200 may not be detached from the boss 153. To this end, the bush bearing 200 may be formed of a material which is elongated and then elastically restored. Therefore, an inner diameter of the bush bearing 200 may be less than an outer diameter of the boss 153, and thus, the bush bearing 200 elongated, inserted into the boss 153, elastically restored, and fixed.

In this case, it is important to set a press-fit range of the bush bearing 200. Generally, the press-fit range is defined as a length difference between a press-fit material and a press-fit target. When a minimum press-fit range of the bush bearing 200 is too small, the inner diameter of the bush bearing 200 may become greater than the outer diameter of the boss 153 due to thermal expansion, and detachment can occur. On the other hand, in a case in which a maximum press-fit range of the bush bearing 200 is too large, when the bush bearing 200 is elongated in press-fitting, the bush bearing 200 may be plastically deformed, and for this reason, the bush bearing 200 may not be restored, and it is impossible to press-fit the bush bearing 200. Therefore, the minimum press-fit range and maximum press-fit range of the bush bearing 200 may be optimally set, and thus, the bush bearing 200 may be solidly fixed without being detached from the boss 153.

The maximum press-fit range of the bush bearing 200 may be based on strength, but generally, a force necessary for an elongation may be the same as a restoration force within an elastic range. Therefore, the maximum press-fit range of the bush bearing 200 may be based on an elongation.

The maximum press-fit range of the bush bearing 200 may be set to approximately 50% or less of an elongation or a break elongation of a material used as the bush bearing 200, and the minimum press-fit range may be approximately 5% to approximately 15% less than the maximum press-fit range. That is, under a condition in which plastic deformation is not caused by temperature, a force necessary for laterally extending a linear material may be a force by which a stretched ring-shaped material is shrunk. In this case, in consideration of a safety ratio (a safety coefficient of 3) of a general linear elastic material, an elongation of approximately 0.6% to approximately 0.7% is suitable, and as shown in the following Table 1, a press-fit range may be approximately 160 μm to approximately 80 μm.

TABLE 1

| Elongation (%) | Press-fit Range (μm) | Tensile Strength (MPa) |
| --- | --- | --- |
| 0.1 | 28 | 11.2 |
| 0.5 | 140 | 56 |
| 1.0 | 280 | 112 |
| 2.0 | 560 | 224 |

Generally, a fatigue limit of a material may be set to a range of approximately 30% to approximately 50% or less of a tensile strength of the material. That is, a tensile strength is proportional to an elongation, and thus, the maximum press-fit range of the bush bearing 200 may be set to approximately 50% or less of an elongation of a corresponding material.

Moreover, a difference between a thermal expansion coefficient of a press-fitted element (the bush bearing) and a thermal expansion coefficient of a correspondent material (the boss) may detach the bush bearing 200 from the boss 153. Therefore, the minimum press-fit range needs a tensile strength (a press-fit range) that prevents the bush bearing 200 from being detached from the boss 153 in a maximum drive mode of the compressor, and the tensile strength is approximately equal to a difference (a ratio) between thermal expansion coefficients of two materials.

Considering a characteristic of the bush bearing 200, in a PEEK material which has an ether ketone bonding and is used as the bush bearing 200 among known PEEK materials, a sample ① (a carbon fiber) may be approximately 30% by weight, a glass transition temperature may be approximately 143° C., a compression strength may be approximately 240 MPa, a tensile strength (ultimate) may be approximately 224 MPa, a break elongation may be approximately 2.0%, a thermal expansion coefficient (CTE, linear) may be approximately 14.0 μm/m-° C., and a maximum service temperature (air) may be approximately 315° C. Alternatively, a sample ② (a carbon fiber) may be approximately 30% by weight, a glass transition temperature may be 162° C., a compression strength may be approximately 310 MPa, a tensile strength may be approximately 270 MPa, a break elongation may be approximately 1.7%, a thermal expansion coefficient may be approximately 10.0 μm/m-° C., and a maximum service temperature may be approximately 387° C.

Therefore, a PEEK material applied to this embodiment may be use a plastic material in which a carbon fiber is contained by approximately 30% by weight, a glass transition temperature may be approximately 143° C. to approximately 162° C., a compression strength may be approximately 240 MPa to approximately 310 MPa, a tensile strength may be approximately 224 MPa to approximately 270 MPa, a break elongation may be approximately 1.7% to approximately 2.0%, a thermal expansion coefficient may be approximately 10.0 μm/m-° C. to approximately 14.0 μm/m-° C., and a maximum service temperature may be approximately 315° C. to approximately 387° C. For example, when a glass transition temperature is lower than approximately 143° C., the bush bearing 200 may be deformed, and thus, a glass transition temperature is equal to or higher than approximately 140° C. Although a bearing load of several MPa is applied to the bush bearing 200 according to this embodiment, an intensive load which is several to tens times the bearing load of several MPa is partially applied to the bush bearing 200, and thus, a compressive strength may be high. Therefore, a material may be a PEEK material, and may have a compressive strength of about 240 MPa to about 310 MPa. Also, when a tensile strength is equal to or higher than a certain level, a corresponding material may be used as a bush bearing for press-fitting, and when a material is a PEEK material, a tensile strength may be approximately 224 MPa to approximately 270 MPa. Also, a material of which an elongation is too small is difficult to set a press-fit range, and thus, a material of about 1% or more and approximately 1.7% to approximately 2.0% may be suitable. Also, when a thermal expansion coefficient of a material is less by a certain level than that of a correspondent material, plastic deformation may occur, and as in this embodiment, when a material is a PEEK material, a thermal expansion coefficient may be approximately 10.0 μm/m-° C. to approximately 14.0 μm/m-° C. Also, in a case in which a service temperature is equal to or lower than about 200° C., it is difficult to ensure a service life when a material is used for a long time, and thus, as in this embodiment, when a material is a PEEK material, a maximum service temperature may be approximately 315° C. to approximately 387° C.

Figure 10:
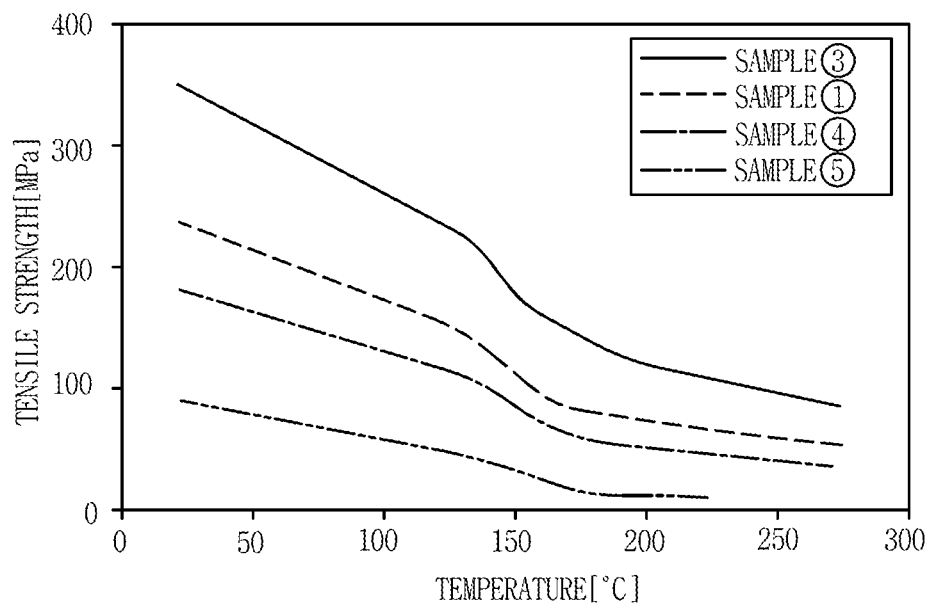
FIG. 10 is a graph showing tensile strength based on temperature for a polyether ether ketone (PEEK) model of a bush bearing according to an embodiment.

FIG. 10 is a graph showing tensile strength based on temperature for a PEEK model of a bush bearing according to an embodiment. Referring to FIG. 10, in sample ③, which has a tensile strength higher than a tensile strength of sample CI, as the tensile strength based on temperature is too high, an elongation should become higher for a press-fit operation, and thus, the bush bearing 200 may be easily detached when the compressor is driven. On the other hand, in sample ④ or sample ⑤, which each has a tensile strength lower than the tensile strength of sample ①, as the tensile strength based on temperature is low, an elongation should become higher for a press-fit operation, and thus, the bush bearing 200 may be easily detached when the compressor is driven. In consideration of this, in sample ④ or sample ⑤, the inner diameter of the bush bearing 200 should be less, but in consideration of the press-fit operation, as a press-fit range is excessively extended, plastic deformation may occur. Therefore, considering tensile strength and plastic deformation, a PEEK material having a tensile strength which is the same as the tensile strength of sample ① or sample ② may be used.

Figure 11:
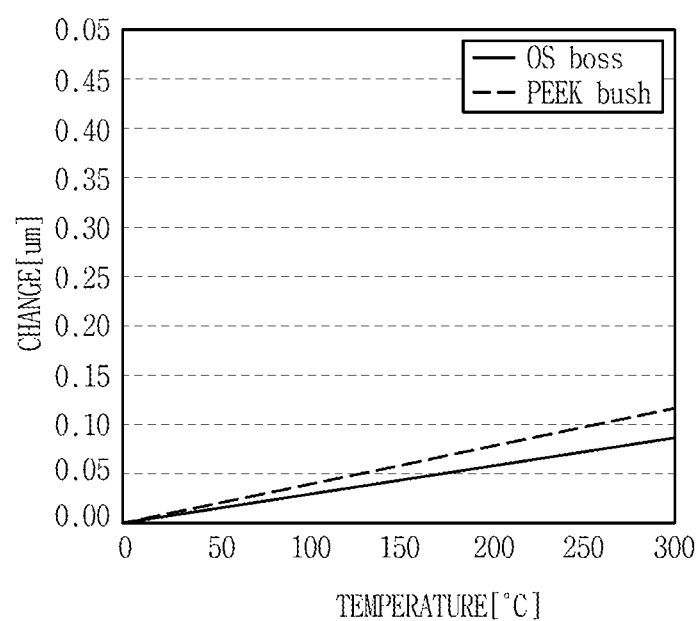
FIGS. 11 and 12 show a deformation difference based on thermal expansion coefficients of an orbiting scroll and a bush bearing according to an embodiment, FIG. 11 being a graph when the thermal expansion coefficients are the same, and FIG. 12 being a graph when the thermal expansion coefficient of the bush bearing is five times higher than the thermal expansion coefficient of the orbiting scroll.
Figure 12:
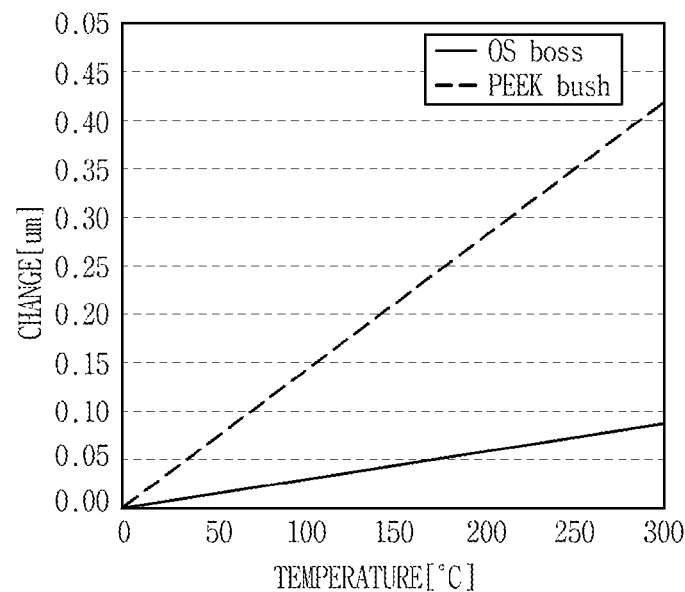

Moreover, when a PEEK material, such as sample ① or sample ②, is used as the bush bearing 200, a press-fit amount may be an important factor in terms of reliability. FIGS. 11 and 12 show a deformation difference based on thermal expansion coefficients of an orbiting scroll and a bush bearing according to an embodiment. FIG. 11 is a graph when the thermal expansion coefficients are the same. FIG. 12 is a graph when the thermal expansion coefficient of the bush bearing is five times higher than the thermal expansion coefficient of the orbiting scroll.

For example, when the thermal expansion coefficient of the bush bearing 200 is the same as the thermal expansion coefficient of the boss 153, it is not required to press-fit the bush bearing 200 to the boss 153. This is because the thermal expansion coefficient of the bush bearing 200 is the same as the thermal expansion coefficient of the boss 153, and thus, even when the bush bearing 200 is merely inserted into the boss 153, the bush bearing 200 is not detached from the boss 153. However, actually, despite that the thermal expansion coefficient of the bush bearing 200 is the same as the thermal expansion coefficient of the boss portion 153, a gap between the bush bearing 200 and the boss 153 may occur due to a centrifugal force when the compressor is being driven, and thus, the bush bearing 200 needs a press-fit amount in consideration of thermal expansion of the bush bearing 200. For example, in sample ① or sample ②, the thermal expansion of the bush bearing 200 is about 1.35 or more times the thermal expansion of the boss 153, and a press-fit amount of the bush bearing 200 may be within about 20 μm to about 220 μm.

As shown in FIG. 11, in sample ① or sample ②, despite that the thermal expansion coefficient of the bush bearing 200 is the same as the thermal expansion coefficient of the boss 153, a drive temperature of the compressor increases, and thus, a deformation amount of the bush bearing 200 gradually increases in comparison with a deformation amount of the boss 153. Therefore, a press-fit amount of about 20 μm may be secured as a press-fit amount of the bush bearing 200 which is needed.

However, as shown in FIG. 12, in a case in which the bush bearing 200 is the same as the previous embodiment, when the thermal expansion coefficient of the bush bearing 200 is 5 times higher than the thermal expansion coefficient of the boss 153, the deformation amount of the bush bearing 200 may increase far more greatly than the thermal expansion coefficient of the boss 153 unlike the previous embodiment. Therefore, in this case, a press-fit amount of about 20 μm may be secured as a press-fit amount of the bush bearing 200 which is needed.

As described above, a component ratio (a model) or an inner diameter of the bush bearing 200 may be limited in consideration of a material characteristic of each of the boss 153 and the bush bearing 200, but the bush bearing 200 may be mechanically fixed to the boss 153.

Figure 13:
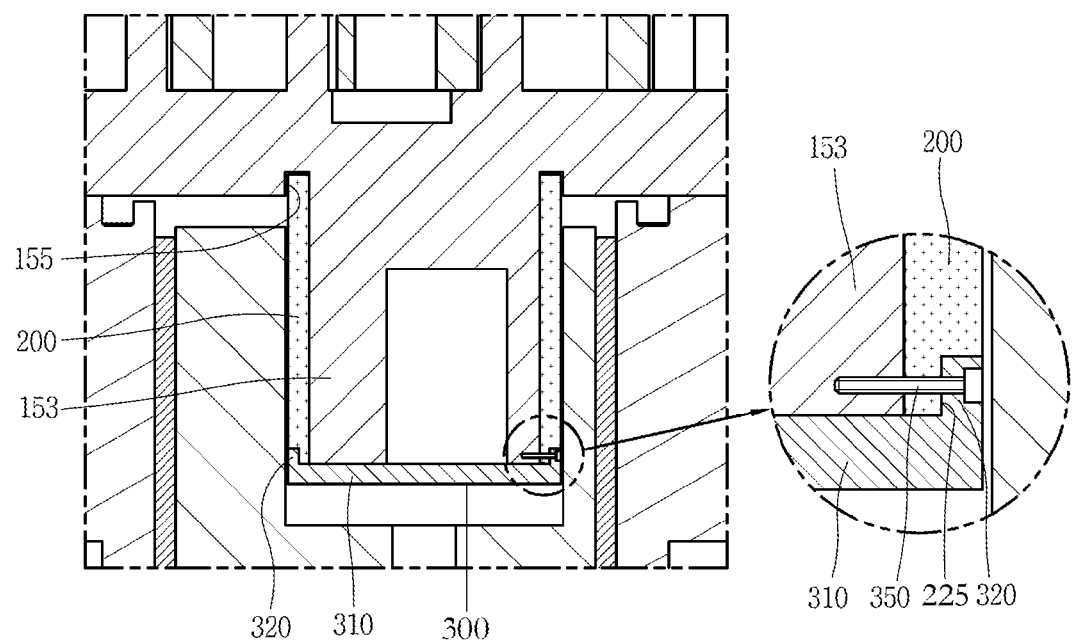
FIGS. 13 and 14 are cross-sectional views illustrating different embodiments for coupling a bush bearing according to an embodiment to a boss.
Figure 14:
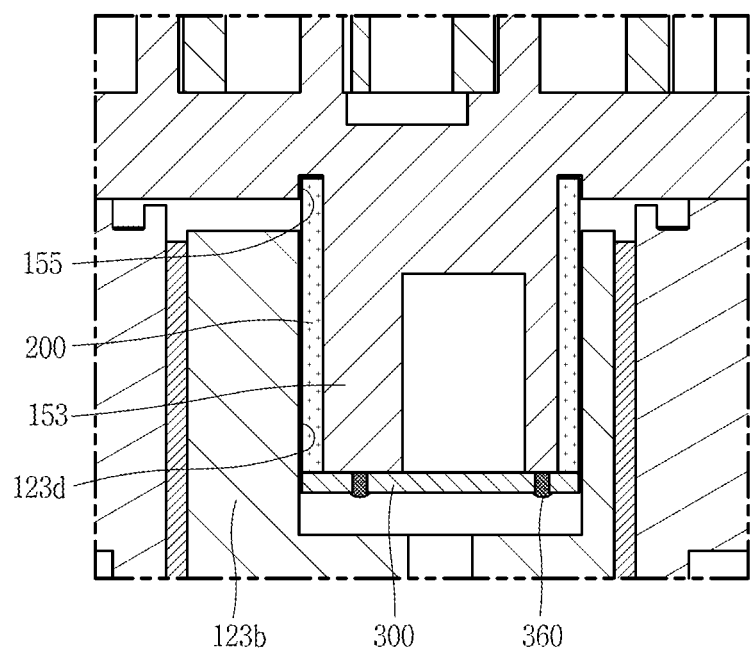

FIGS. 13 and 14 are cross-sectional views illustrating different embodiments for coupling a bush bearing to a boss. As illustrated in FIGS. 13 and 14, a fixed member 300 that supports a lower end of the bush bearing 200 inserted into the boss 153 of the orbiting scroll 150 in order for the bush bearing 200 to be fixed to the boss 153 may be further provided. The fixed member 300 may be formed in a circular plate shape so as to support an entire lower end of the bush bearing 200, or may be formed in a rectangular shape so that the fixed member 300 crosses the lower end of the bush bearing 200 without supporting the entire lower end of the bush bearing 200 and supports the bush bearing 200 at both ends of the boss 153.

A central portion of the fixed member 300 may be coupled to the boss portion 153 with a bolt, for example, and may be fixed by welding, for example. A second fixing portion 320 may be formed to be bent at both ends of a first fixing portion 310 of the fixed member 300. In a state in which the bent second fixing portion 320 is closely adhered to the outer circumferential surface of the bush bearing 200, the second fixing portion 320 may be fixed by a bolt 350, for example, or the first fixing portion 310 may be fixed to a bottom of the boss 153 by a welding 360, for example.

When both ends of the fixed member 300 are bent and are closely adhered to the outer circumferential surface of the bush bearing 200, an escape groove 225 may be formed deeper than a thickness of the second fixing portion 320 at the outer circumferential surface of the bush bearing 200. The lower end of the bush bearing 200 may be formed in an opened shape, and depending on the case, the lower end of the bush bearing 200 may be formed in a closed shape like a cap shape and may be press-fitted to the boss 153.

As illustrated in FIG. 13, a bearing inserting groove 155 may be formed at a point at which the plate 151 of the orbiting scroll 150 meets the boss 153, to bind the bush bearing 200 in a centrifugal direction. Therefore, an upper end of the bush bearing 200 may be inserted into the bearing inserting groove 155, and thus, the outer circumferential surface of the bush bearing 200 may be closely adhered and bound, there preventing the bush bearing 200 from deviating to the outside.

As illustrated in FIG. 7, one or more protrusion 222 and one or more groove 156 may be, respectively, formed at the inner circumferential surface of the bush bearing 200 and the outer circumferential surface of the boss 153, and may be hook-assembled.

Figure 15:
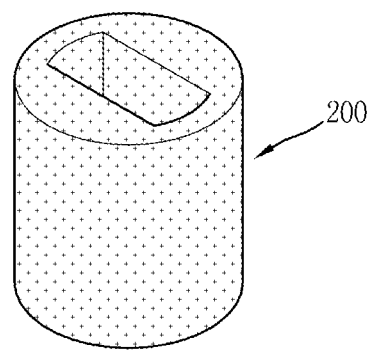
FIG. 15 is a perspective view of an inner circumferential surface of a bush bearing according to another embodiment.

The inner circumferential surface of the bush bearing 200 may be formed in a circle shape, but depending on the case, as illustrated in FIG. 15, the inner circumferential surface of the bush bearing 200 may be formed in a polygonal shape. In this case, the outer circumferential surface of the boss 153 may also be formed in a polygonal shape so as to correspond to the inner circumferential surface of the bush bearing 200. Accordingly, the bush bearing 153 may not idle with respect to the boss 153, and thus, a press-fit strength and an elongation may be lowered.

Figure 16:
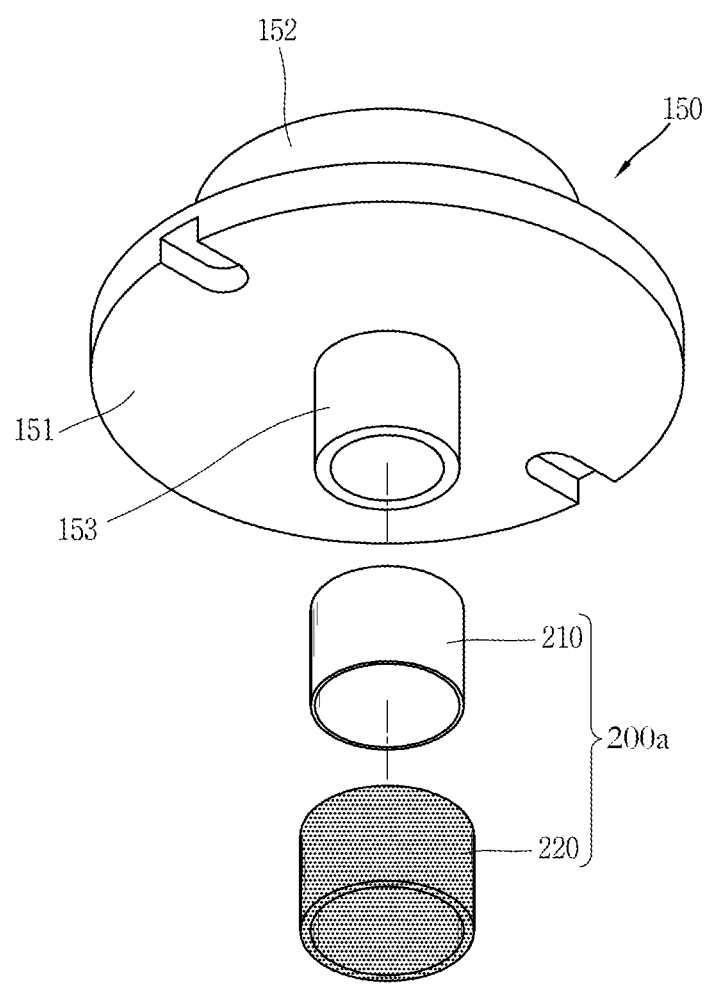
FIG. 16 is an exploded perspective view of a bush bearing in a scroll compressor according to another embodiment.
Figure 17:
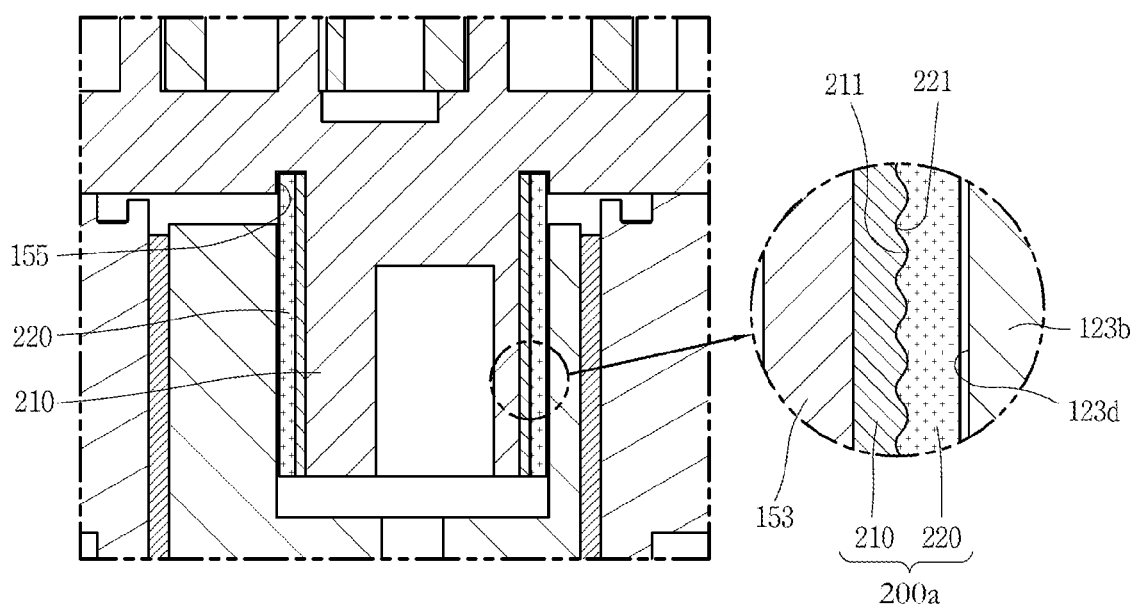
FIG. 17 is an assembled vertical cross-sectional view of a bush bearing in a scroll compressor according to another embodiment.

Another embodiment of a shape of the bush bearing is as follows. FIG. 16 is an exploded perspective view of a bush bearing in a scroll compressor according to another embodiment. FIG. 17 is an assembled vertical cross-sectional view of a bush bearing in a scroll compressor according to another embodiment.

In the above-described embodiment, the bush bearing is provided as a single element. However, in this embodiment, the bush bearing 200a may include a fixed bush 210, which may be press-fitted to the boss 153, and a lubricating bush 220, which may be inserted onto an outer circumferential surface of the fixed bush 210.

The fixed bush 210 may be formed of a same metal material as a metal material of boss 153 or a metal material having a similar physical property value. However, the fixed bush 210 may not be limited to a metal material, and may be formed of any material having higher rigidity than a rigidity of the lubricating bush 220. As the fixed bush 210 is press-fitted to the boss 153, the fixed bush 210 may be formed in a ring cross-sectional shape.

The lubricating bush 220 may be formed of a same material as a material of the bush bearing 200, which may be a single element as described above with respect the above-described embodiment. The lubricating bush 220 may be inserted into and coupled to the outer circumferential surface of the fixed bush 210. In this case, the lubricating bush 220 may be press-fitted to the outer circumferential surface of the lubricating bush 220, or may be adhered to the outer circumferential surface of the lubricating bush 220 using an adhesive. However, when the lubricating bush 220 is provided at the outer circumferential surface of the fixed bush 210 though insert injection molding using a mold, the lubricating bush 220 may maintain a stable coupling force despite a high temperature change while the compressor is being driven, and moreover, a size change of the bush bearing 200 may be minimized.

When the lubricating bush 220 is press-fitted to the fixed bush 210, as in the above-described embodiment, the lubricating bush 220 may be formed in a ring cross-sectional bush form having no slit. That is, in a case in which the lubricating bush 220 is formed in a snap ring shape having a slit, the lubricating bush 220 may be elongated, and then, when a force applied to the lubricating bush 220 is removed, the lubricating bush 220 cannot be restored. In this case, when the lubricating bush 220 is press-fitted and coupled to the fixed bush 210, the lubricating bush 220 may be formed in a structure having no slit.

Further, in a case in which the lubricating bush 220 is injected and coupled to the fixed bush 210, the injected lubricating bush 220 may be thermally contracted, and thus, a coupling force with the fixed bush 210 may increase. Also, when the fixed bush 210 of a metal material is press-fitted and coupled to the boss 153 at a high press-fit range, a coupling force with the boss 153 may increase without deformation.

In order for the lubricating bush 220 to be solidly fixed to the fixed bush 210, a thermal expansion coefficient of the lubricating bush 220 may be equal to or less than the thermal expansion coefficient of the fixed bush 210.

The lubricating bush 220 may be formed of a material according to the above-described embodiment, namely, a PEEK material which is a plastic material having an ether ketone bonding. As described above, when the lubricating bush 220 is formed of a PEEK material, a material should be selected in appropriate consideration of a thermal expansion coefficient of each of the fixed bush 210 and the lubricating bush 220 and a maximum press-fit range, or a minimum press-fit range of the lubricating bush 220, and thus, the lubricating bush 220 may smoothly perform a function of a bearing without being detached from the fixed bush 210 in driving. However, as the fixed bush 210 and the lubricating bush 220 have the approximately same thermal expansion rate, the lubricating bush 220 may use a material equal to that of the bush bearing according to the above-described embodiment.

In addition, the lubricating bush 220 may be formed by various methods, such as a method in which the lubricating bush 220 is formed by coating, which is performed on the outer circumferential surface of the fixed bush 210 to a certain thickness.

As illustrated in FIG. 17, one or more protrusion 211 and one or more groove 221 may be, respectively, formed at the inner circumferential surface of the fixed bush 210 and the outer circumferential surface of the lubricating bush 220, and may be hook-assembled.

Figure 18:
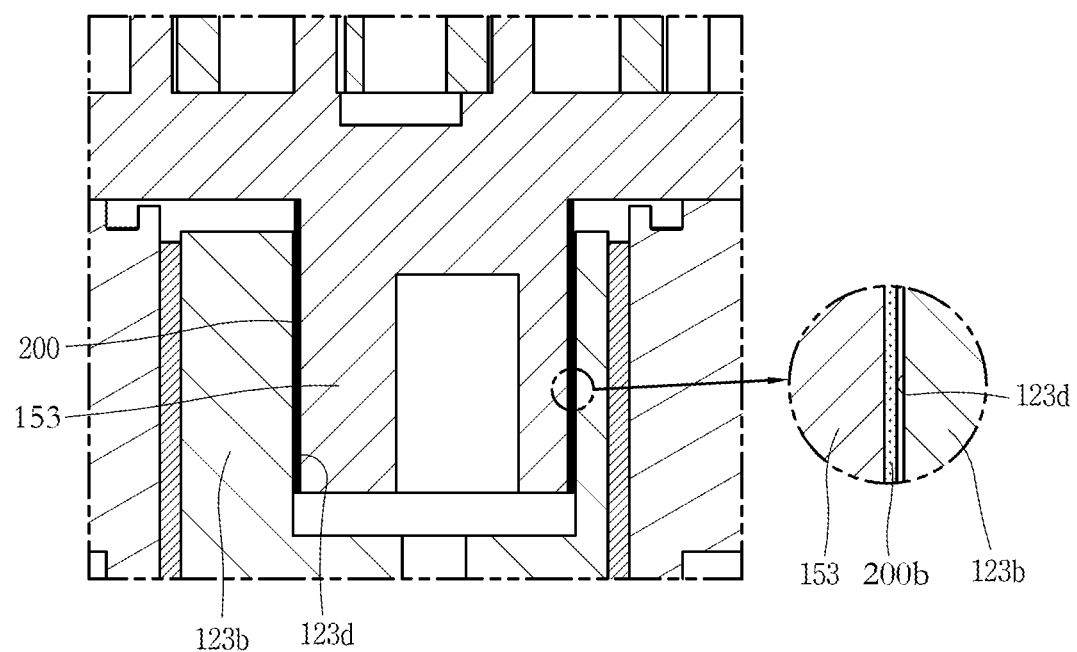
FIG. 18 is a vertical cross-sectional view of a bush bearing in a scroll compressor according to another embodiment.

FIG. 18 is a vertical cross-sectional view of a bush bearing in a scroll compressor according to another embodiment. As illustrated in FIG. 18, a thickness of bearing member 200b may be minimized, and thus, a shaft hole of a frame may be minimized. Therefore, as a contact area is reduced, friction loss may be reduced. Accordingly, an efficiency of the compressor may increase, and moreover, a weight of the orbiting scroll may be minimized.

In a bush bearing for a scroll compressor and a scroll compressor including a bush bearing according to embodiments, the boss of the orbiting scroll may be inserted into and coupled to the boss coupling groove of the rotational shaft, and thus, an eccentric load applied to the rotational shaft may be reduced. Therefore, friction loss at the lubricating bush bearing may be reduced, compression efficiency and reliability enhanced, and noise reduced. Also, a weight of the eccentric mass and the material costs may be reduced, and a deformation amount of the rotational shaft may be reduced, thereby enhancing compression efficiency.

Further, as it is not required to form a separate pocket groove at the main frame, a length and a diameter of the main frame may be reduced, and the material costs reduced. Also, a stacked height of the motor may increase within a limited axial length of the compressor.

Furthermore, as the bush bearing is coupled to the boss of the orbiting scroll, the outer circumferential surface of the bush bearing may wholly contact the inner circumferential surface of the boss coupling groove, and thus, the outer circumferential surface of the bush bearing may be prevented from being intensively contacted, thereby preventing the bush bearing from being damaged.

Moreover, although the bush bearing is formed in a ring shape and is press-fitted to the boss, as a material of the bush bearing uses a plastic material having an ether ketone bonding in consideration of a thermal expansion rate, an elongation, and a press-fit range, the bush bearing may be effectively prevented from being detached from the boss, thereby enhancing a reliability of a compressor.

Embodiments disclosed herein provide a bush bearing and a scroll compressor including a bush bearing, which reduce an eccentric load applied to a rotational shaft by removing or decreasing a height difference between a supporting point at which the rotational shaft is supported by the main frame and an action point at which the rotational shaft acts on an orbiting scroll, enhance compression efficiency by reducing friction loss of a bearing, and decrease noise of the scroll compressor by lowering an action force at a welding point, thereby enhancing reliability.

Embodiments disclosed herein further provide a bush bearing and a scroll compressor including a bush bearing, which reduce material costs and a weight of an eccentric mass disposed at a rotational shaft by decreasing an eccentric load applied to the rotational shaft, enhance compression efficiency by reducing a deformation amount of the rotational shaft, and decrease noise of the scroll compressor by lowering an action force at a welding point based on a centrifugal force of the eccentric mass, thereby enhancing reliability.

Embodiments disclosed herein provide a bush bearing and a scroll compressor including a bush bearing, which, by decreasing a length and a size of a main frame, reduce material costs, decrease an axial direction length of the scroll compressor, and increase a stacked height of a motor with respect to the axial direction length of the scroll compressor.

Embodiments disclosed herein provide a bush bearing for a compressor, which is provided between a boss coupling groove of a rotational shaft and a boss portion or boss of a member which is inserted into the boss coupling groove of the rotational shaft and receives a rotating force through the rotational shaft, and is inserted into and supported by an outer circumferential surface of the boss portion, the bush bearing including a lubricating bush, which may be formed of a plastic material having an ether ketone bonding to have a ring cross-sectional shape.

A strength of the lubricating bush may be about 50% or less of a tensile strength of a material forming the bush bearing, and an elongation of the lubricating bush material may be about 50% or less of a break elongation of a material forming the bush bearing. Also, a maximum press-fit range of the lubricating bush may be about 50% or less of an elongation of a plastic material forming the bush bearing.

A thermal expansion coefficient of the plastic material forming the lubricating bush may be about 0.9 to 5 or less times a thermal expansion coefficient of the boss portion, and a minimum press-fit range of the lubricating bush may be about 5% to about 15% higher than the maximum press-fit range.

A glass transition temperature of the lubricating bush may be higher than a drive temperature of a compressor, and the lubricating bush may be formed of a polyether ether ketone (PEEK) material.

The lubricating bush may be formed of a material in which a glass transition temperature is about 143° C. to about 162° C., a compression strength (ultimate) is about 240 MPa to about 310 MPa, a tensile strength is about 224 MPa to about 270 MPa, a break elongation is about 1.7% to about 2.0%, a thermal expansion coefficient (linear) is about 10.0 μm/m-° C. to about 14.0 μm/m-° C., a maximum service temperature (air) is about 315° C. to about 387° C., and a carbon fiber is contained by about 30% by weight.

The bushing bearing may be configured as the lubricating bush, and the lubricating bush may be coupled to the boss portion as an inner circumferential surface of the lubricating bush contacts an outer circumferential surface of the boss portion. Moreover, an anti-slide boss and an anti-slide groove may be formed at an inner circumferential surface of the lubricating bush and an outer circumferential surface of the boss portion. The anti-slide boss and the anti-slide groove may be coupled with each other.

A fixed bush inserted into the boss portion may be further provided at an inner circumferential surface of the lubricating bush, and the fixed bush may be formed of a material that has a higher rigidity than a rigidity of the lubricating bush. Moreover, an anti-slide boss and an anti-slide groove may be formed at an inner circumferential surface of the lubricating bush and an outer circumferential surface of the boss portion.

Embodiments disclosed herein provide a scroll compressor that may include a container; a main frame fixedly disposed in the container, a shaft hole being formed at or in the main frame; a non-orbiting scroll coupled to the frame, a non-orbiting wrap being provided at the non-orbiting scroll; an orbiting scroll supported by the frame, and configured to include an orbiting wrap, forming a compression space that continuously moves in engagement with the non-orbiting wrap, and a boss portion or boss that protrudes in the shaft hole direction and receives a rotating force of the drive motor; and a rotational shaft configured to include a boss coupling groove, and transfer the rotating force of the drive motor to the orbiting scroll. The boss portion of the orbiting scroll may be inserted into and coupled to the boss coupling groove. A bush bearing may be provided between the boss portion and the boss coupling groove. The bush bearing may be formed of a plastic material having an ether ketone bonding and having a ring cross-sectional shape.

The boss portion may be extension-formed at a bottom of a plate portion or plate, on which the orbiting wrap is provided. A bearing inserting groove may be formed at a portion in which the plate portion contacts the boss portion. One end of the bush bearing may be inserted into and coupled to the bearing inserting groove. The bearing inserting groove may be formed to have a size in which an inner circumferential surface of the bearing inserting groove is closely adhered to an outer circumferential surface of the bush bearing under a drive temperature of a compressor.

A fixed member that fixes the bush bearing to the boss portion may be coupled to an axial-direction lower end of the boss portion. The fixed member may include a first fixing portion configured to cross an one end of the bush bearing; and at least two second fixing portions configured to protrude from both ends of the first fixing portion, and fixed to the bush bearing.

An escape groove may be formed at an outer circumferential surface of the bush bearing, so that the at least two second fixing portions may be inserted into the escape groove. The escape groove may be formed deeper than a thickness of each of the at least two second fixing portions.

Embodiments disclosed herein further provide a scroll compressor that may include a container; a main frame fixedly disposed in the container, a shaft hole being formed at the main frame; a non-orbiting scroll coupled to the frame, a non-orbiting wrap being provided at the non-orbiting scroll; an orbiting scroll supported by the frame, and configured to include an orbiting wrap, forming a compression space that continuously moves in engagement with the non-orbiting wrap, and a boss portion or boss that protrudes in the shaft hole direction and receives a rotating force of the drive motor; a rotational shaft configured to include a boss coupling groove, and transfer the rotating force of the drive motor to the orbiting scroll, the boss portion of the orbiting scroll being inserted into and coupled to the boss coupling groove; and a bush bearing member provided between the boss portion and the boss coupling groove. The bush bearing member may be formed of a plastic material which has an ether ketone bonding and in which a glass transition temperature is about 143° C. to about 162° C., a compression strength (ultimate) is about 240 MPa to about 310 MPa, a tensile strength is about 224 MPa to about 270 MPa, a break elongation is about 1.7% to about 2.0%, a thermal expansion coefficient (linear) is about 10.0 μm/m-° C. to about 14.0 μm/m-° C., and a maximum service temperature (air) is about 315° C. to about 387° C. The bush bearing member may contain a carbon fiber by about 30% by weight.

Further scope of applicability will become more apparent from the detailed description given herein. However, it should be understood that the detailed description and specific examples, while indicating embodiments, are given by way of illustration only, as various changes and modifications within the spirit and scope will become apparent to those skilled in the art from the detailed description.

The foregoing embodiments and advantages are merely exemplary and are not to be considered as limiting. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A bush bearing for a compressor, which is provided between a boss coupling groove of a rotational shaft and a boss, which is inserted into the boss coupling groove of the rotational shaft and receives a rotating force through the rotational shaft, and which is inserted into and supported by an outer circumferential surface of the boss, the bush bearing comprising: a lubricating bush formed of a plastic material having an ether ketone bonding and a ring cross-sectional shape, wherein the lubricating bush is formed of a material in which a glass transition temperature is 143° C. to 162° C., a compression strength (ultimate) is 240 MPa to 310 MPa, a tensile strength is 224 MPa to 270 MPa, a break elongation is 1.7% to 2.0%, a thermal expansion coefficient (linear) is 10.0 μm/m-° C. to 14.0 μm/m-° C., and a maximum service temperature (air) is 315° C. to 387° C.

2. The bush bearing of claim 1, wherein a strength of the lubricating bush is 50% or less of a tensile strength of a material forming the bush bearing.

3. The bush bearing of claim 1, wherein an elongation of the lubricating bush is 50% or less of a break elongation of a material forming the bush bearing.

4. The bush bearing of claim 1, wherein a maximum press-fit range of the lubricating bush is 50% or less of an elongation of a plastic material forming the bush bearing.

5. The bush bearing of claim 4, wherein a thermal expansion coefficient of the plastic material forming the lubricating bush is 0.9 to 5 or less times a thermal expansion coefficient of the boss.

6. The bush bearing of claim 4, wherein a minimum press-fit range of the lubricating bush is 5% to 15% higher than the maximum press-fit range.

7. The bush bearing of claim 1, wherein a glass transition temperature of the lubricating bush is higher than a drive temperature of the compressor.

8. The bush bearing of claim 1, wherein the lubricating bush is formed of a polyether ether ketone (PEEK) material.

9. The bush bearing of claim 1, wherein the lubricating bush contains a carbon fiber by 30% by weight.

10. The bush bearing of claim 1, wherein the lubricating bush is coupled to the boss such that an inner circumferential surface of the lubricating bush contacts an outer circumferential surface of the boss.

11. The bush bearing of claim 10, wherein at least one protrusion and at least one groove are formed, respectively, at the inner circumferential surface of the lubricating bush and the outer circumferential surface of the boss, and wherein the at least one protrusion and the at least one groove are coupled with each other.

12. The bush bearing of claim 1, further comprising a fixed bush inserted onto the boss is further provided at an inner circumferential surface of the lubricating bush, and wherein the fixed bush is formed of a material having a higher rigidity than a rigidity of the lubricating bush.

13. The bush bearing of claim 12, wherein at least one protrusion and at least one groove are formed at an inner circumferential surface of the lubricating bush and an outer circumferential surface of the boss, respectively, and wherein the at least one protrusion and the at least one groove are coupled with each other.

14. A scroll compressor comprising the bush bearing of claim 1.

15. A scroll compressor, comprising:
a container;
a main frame fixedly provided in the container, wherein a shaft hole is formed in the main frame;
a non-orbiting scroll coupled to the frame, wherein a non-orbiting wrap is provided on the non-orbiting scroll;
an orbiting scroll supported by the frame, and including an orbiting wrap that forms a compression space that continuously moves in engagement with the non-orbiting wrap, and a boss that protrudes in the shaft hole direction and receives a rotating force of the drive motor; and
a rotational shaft including a boss coupling groove, the rotational shaft transferring the rotating force of the drive motor to the orbiting scroll, wherein the boss of the orbiting scroll is inserted into and coupled to the boss coupling groove, wherein a bush bearing is provided between the boss and the boss coupling groove, wherein the bush bearing is formed of a plastic material having an ether ketone bonding and a ring cross-sectional shape, and wherein the bush bearing is coupled to the boss such that an inner circumferential surface of the bush bearing completely contacts an outer circumferential surface of the boss and only a portion of an outer circumferential surface of the bush bearing contacts an inner circumferential surface of the boss coupling groove as the rotational shaft rotates.

16. The scroll compressor of claim 15, wherein the boss extends from a bottom of a plate on which the orbiting wrap is provided, wherein a bearing inserting groove is formed at a portion at which the plate contacts the rotational shaft, and wherein one end of the bush bearing is inserted into and coupled to the bearing inserting groove.

17. The scroll compressor of claim 16, wherein a size of an inner circumferential surface of the bearing inserting groove is formed such that the bearing inserting groove is closely adhered to an outer circumferential surface of the bush bearing under a drive temperature of the compressor.

18. The scroll compressor of claim 15, wherein a fixed member that fixes the bush bearing to the boss is coupled to an axial-direction lower end of the boss.

19. The scroll compressor of claim 18, wherein the fixed member comprises:
a first fixing portion configured to cross one end of the bush bearing; and
at least two second fixing portions configured to protrude from edge of the first portion, and be fixed to the bush bearing.

20. The scroll compressor of claim 18, wherein an escape groove is formed at an outer circumferential surface of the bush bearing so that the at least two second fixing portions are inserted into the escape groove, and wherein the escape groove is formed deeper than a thickness of each of the at least two second fixing portions.

21. A scroll compressor, comprising: a container; a main frame disposed in the container, wherein a shaft hole is formed in the main frame; a non-orbiting scroll coupled to the frame, wherein a non-orbiting wrap is provided at the non-orbiting scroll; an orbiting scroll supported by the frame, and including an orbiting wrap that forms a compression space that continuously moves in engagement with the non-orbiting wrap, and a boss that protrudes in the shaft hole direction and receives a rotating force of the drive motor; a rotational shaft including a boss coupling groove, the rotational shaft transferring the rotating force of the drive motor to the orbiting scroll, wherein the boss of the orbiting scroll is inserted into and coupled to the boss coupling groove; and a bush bearing provided between the boss and the boss coupling groove, wherein the bush bearing is formed of a plastic material having an ether ketone bonding and in which a glass transition temperature is 143° C. to 162° C., a compression strength (ultimate) is 240 MPa to 310 MPa, a tensile strength is 224 MPa to 270 MPa, a break elongation is 1.7% to 2.0%, a thermal expansion coefficient (linear) is 10.0 μm/m-° C. to 14.0 μm/m-° C., and a maximum service temperature (air) is 315° C. to 387° C.

22. The scroll compressor of claim 21, wherein the bush bearing member contains a carbon fiber by 30% by weight.

23. The scroll compressor of 21, wherein the bush bearing has a ring cross-sectional shape.

24. The bush bearing of claim 15, wherein a strength of the lubricating bush is 50% or less of a tensile strength of a material forming the bush bearing.

25. The bush bearing of claim 15, wherein an elongation of the lubricating bush is 50% or less of a break elongation of a material forming the bush bearing.

26. The bush bearing of claim 15, wherein a maximum press-fit range of the lubricating bush is 50% or less of an elongation of a plastic', material forming the bush bearing.

27. The bush bearing of claim 26, wherein a thermal expansion coefficient of the plastic material forming the lubricating bush is 0.9 to 5 or less times a thermal expansion coefficient of the boss.

28. The bush bearing of claim 26, wherein a minimum press-fit range of the lubricating bush is 5% to 15% higher than the maximum press-fit range.

* * * * *